(12) United States Patent
Grindeland et al.

(10) Patent No.: US 6,966,052 B1
(45) Date of Patent: Nov. 15, 2005

(54) METHOD AND APPARATUS FOR TOP-DOWN TESTING BASED ON END USER DOCUMENTATION

(75) Inventors: David D Grindeland, Fort Collins, CO (US); Scott W. Parker, Loveland, CO (US); Carlos A Bonilla, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 638 days.

(21) Appl. No.: 09/799,907

(22) Filed: Mar. 6, 2001

(51) Int. Cl.[7] .................................. G06F 9/44
(52) U.S. Cl. ....................................... 717/131
(58) Field of Search ................. 717/120–131

(56) References Cited

U.S. PATENT DOCUMENTS

| | | | | |
|---|---|---|---|---|
| 5,802,367 | A | * | 9/1998 | Held et al. ............... 719/332 |
| 5,949,999 | A |   | 9/1999 | Song et al. ............... 717/127 |
| 6,505,342 | B1 | * | 1/2003 | Hartmann et al. .......... 717/104 |
| 2003/0003432 | A1 | * | 1/2003 | Kinzhalin et al. .......... 434/322 |
| 2003/0192009 | A1 | * | 10/2003 | Arcand et al. ............. 715/513 |

OTHER PUBLICATIONS

Deshmukh et al., "The Role of Testing Methodologies in Open Systems Standards," 1994, Proceedings of the 16th International Conference on Software Engineering, pp. 233-240.*

Quinlin, "current draft of POSIX 1003.2B file," 1996, pp 1-9, http://www.catb.org/~esr/magic-numbers/mail-archive/0017.html.*

* cited by examiner

*Primary Examiner*—Wei Y. Zhen
*Assistant Examiner*—Lawrence Shrader

(57) ABSTRACT

Top-down testing is a mechanism that, by setting up a central location for the modification of test documentation and test execution, provides for close proximity of the text execution and the description of the test. In particular, by providing assertions which point to the line of end user documentation being tested, as well as the associated test script code, top-down testing enables a tester easily trace back to the origin in the end user documentation reference. In addition, the tester can quickly become productive with little product knowledge or test expertise.

22 Claims, 4 Drawing Sheets

METHOD AND APPARATUS FOR TOP-DOWN TESTING BASED ON END USER DOCUMENTATION

TECHNICAL FIELD

The present invention relates to test execution in a computer system, and, in particular, to top-down test development and execution.

BACKGROUND

In end user document testing, it is usually difficult to understand, especially at a later point in time, what the tests were designed to do, and what was actually being tested. Accordingly, better control or tracking of document testing becomes increasingly important. The approach and results applied to document testing may all need to be documented and tracked, including the rationale for the level of testing performed and the recording of specific critical data for test procedures.

Existing document testing practices typically describe test codes separate from test documentation. Because the test codes and the test documentation are in separate files, and may change independently of one other, the existing practices can quickly lead to out of date documentation, or generate test codes that do not match the documentation. Testers who need to deal with an existing test often realize that they cannot determine the intent of the test, much less how to change it.

SUMMARY

Top-down testing is a mechanism that, by setting up a central location for the modification of test documentation and test execution, provides for close proximity of the text execution and the description of the test. Top-down testing enables comprehensive testing of end user documentation, especially that related to command line or programming interface usage. In particular, by providing assertions which point to the line of end user documentation being tested, as well as the associated test script code, top-down testing enables a tester easily to trace back to the origin in the end user documentation reference. In addition, the tester can quickly become productive with little product knowledge or test expertise.

Top-down testing facilitates the testing of the end user documentation as well as the product. If the document is a manual page or a user manual, for example, incomplete descriptions may be identified and fixed quickly and efficiently, thus improving the implementor's confidence that the product and documentation are in synch.

DESCRIPTION OF THE DRAWINGS

The detailed description refers to the following drawings, in which like numbers refer to like elements, and in which.

DETAILED DESCRIPTION

Top-down testing is a mechanism that, by setting up a central location for the modification of test documentation and test execution, provides for close proximity of the text execution and the description of the test. Top-down testing enables comprehensive testing of end user documentation, especially that related to command line or programming interface usage. In particular, by providing assertions which point to the line of end user documentation being tested, as well as the associated test script code, top-down testing enables a tester easily trace back to the origin in the end user documentation reference.

Top-down testing may be applied to a computer network system, referred to as service control manager (SCM) module. The SCM module typically multiplies system administration effectiveness by distributing the effects of existing tools efficiently across managed servers. The phrase "service control manager" is intended as a label only, and different labels can be used to describe modules or other entities having the same or similar functions.

In the SCM domain, the managed servers (systems) are referred to as "managed nodes" or simply as "nodes". SCM node groups are collections of nodes in the SCM module. They may have overlapping memberships, such that a single node may be a member of more than one group. The grouping mechanism may allow flexible partitioning of the SCM module so that users may use it to reflect the way nodes are already grouped in their environment.

Figure 1:
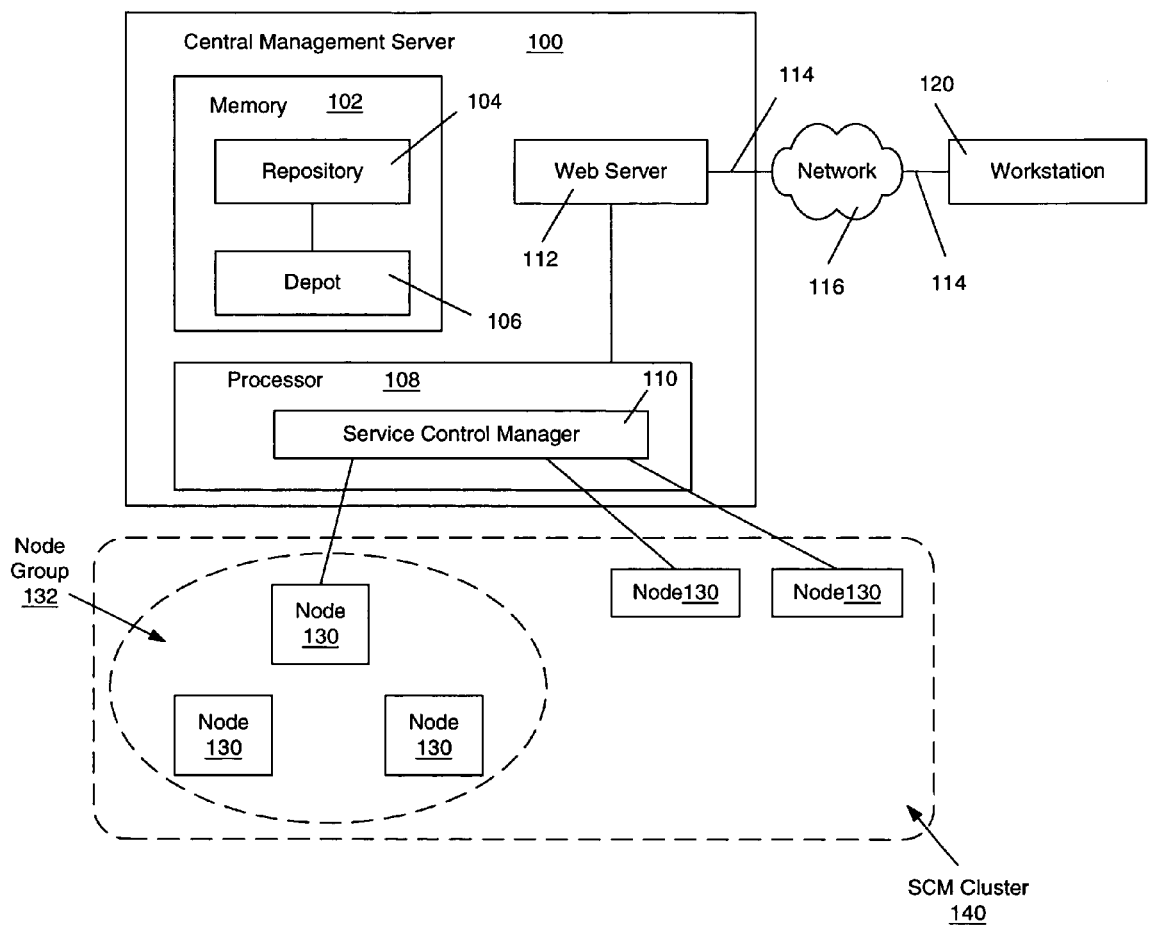
FIG. 1 illustrates a computer network system with which the present invention may be used.

FIG. 1 illustrates a computer network system with which the present invention may be used. The network system includes an SCM 110 running on a Central Management Server (CMS) 100 and one or more nodes 130 or node groups 132 managed by the SCM 110. The one or more nodes 130 and node groups 132 make up an SCM cluster 140.

The CMS 100 can be implemented with, for example, an HP-UX 11.x server running the SCM 110 software. The CMS 100 includes a memory 102, a secondary storage device (not shown), a processor 108, an input device (not shown), a display device (not shown), and an output device (not shown). The memory 102 may include computer readable media, RAM or similar types of memory, and it may store one or more applications for execution by processor 108, including the SCM 110 software. The secondary storage device may include computer readable media, a hard disk drive, floppy disk drive, CD-ROM drive, or other types of non-volatile data storage. The processor 108 executes the SCM software and other application(s), which are stored in memory or secondary storage, or received from the Internet or other network 116. The input device may include any device for entering data into the CMS 100, such as a keyboard, key pad, cursor-control device, touch-screen (possibly with a stylus), or microphone. The display device may include any type of device for presenting a visual image, such as, for example, a computer monitor, flat-screen display, or display panel. The output device may include any type of device for presenting data in hard copy format, such as a printer, and other types of output devices include speakers or any device for providing data in audio form. The CMS 100 can possibly include multiple input devices, output devices, and display devices.

The CMS 100 itself may be required to be a managed node, so that multi-system aware (MSA) tools may be invoked on the CMS. All other nodes 130 may need to be explicitly added to the SCM cluster 140.

Generally, the SCM 110 supports managing a single SCM cluster 140 from a single CMS 100. All tasks performed on the SCM cluster 140 are initiated on the CMS 100 either directly or remotely, for example, by reaching the CMS 100 via a web connection 114. Therefore, the workstation 120 at which a user sits only needs a web connection 114 over a network 116, such as the Internet or other type of computer network, to the CMS 100 in order to perform tasks on the SCM cluster 140. The CMS 100 preferably also includes a centralized data repository 104 for the SCM cluster 140, a web server 112 that allows web access to the SCM 110 and a depot 106 that includes products used in the configuring of nodes 130. A user interface may only run on the CMS 100, and no other node 130 in the SCM module may execute remote tasks, access the repository 104, or any other SCM operations.

Although the CMS 100 is depicted with various components, one skilled in the art will appreciated that this server can contain additional or different components. In addition, although aspects of an implementation consistent with the present invention are described as being stored in memory, one skilled in the art will appreciated that these aspects can also be stored on or read from other types of computer program products or computer-readable media, such as secondary storage devices, including hard disks, floppy disks, or CD-ROM; a carrier wave from the Internet or other network; or other forms of RAM or ROM. The computer-readable media may include instructions for controlling the CMS 100 to perform a particular method.

A central part of the SCM module 110 is the ability to execute various management commands or applications on the one or more nodes simultaneously. The commands or applications may need to be encapsulated with an SCM tool, which is typically used to copy files and/or execute commands on the target nodes 130. The SCM tool may run simple commands such as bdf(1) or mount (1M), launch single system interactive applications such as System Administration Manager (SAM) or Glance, launch multi-system aware applications such as Ignite/UX or Software Distributor (SD), or perform other functions. The tool may be defined using either an SCM tool definition language through command line interface (CLI) or an SCM-provided graphical user interface (GUI).

There are two general types of tools: single-system aware (SSA) tools and multi-system aware (MSA) tools. SSA tools may run on a node 130 and may only affect the operation of that node 130. To run SSA tools on multiple target nodes 130, the SCM module 110 may execute the tools on each target node 130. In addition to executing commands or launching applications, SSA tools may copy files from the CMS 100 to the target nodes 130. Files may only be copied from the CMS 100 to the managed nodes 130 in this exemplary embodiment, not from the nodes 130 back to the CMS 100.

MSA tools may run on a single node 130 but may be able to operate on multiple other nodes 130. MSA tools are applications that execute on a single node but can detect and contact other nodes to accomplish their work and this contact is out of the control of the SCM module 110. This type of application may need to have a list of nodes 130 passed as an argument at runtime. A node 130 where the application will execute may need to be specified at tool creation time, not at runtime. The target nodes 130 selected by the user may be passed to an MSA tool via a target environment variable that contains a target node list for the MSA tools. MSA tools may not copy files to either the manager node 100 or to the target nodes 130 in this exemplary embodiment. Therefore, an execution command string may be required for MSA tools.

An SCM user may be a user that is known to the SCM module 110 and has some privileges and/or management roles. An SCM role, which is an expression of intent and a collection of tools for accomplishing that intent, typically defines what the user is able to do on the associated nodes 130 or node groups 132, e.g., whether a user may run a tool on a node 130. Typically, in order to start the SCM module 110 or execute any SCM tools, the user may need to be added to the SCM module 110 and authorized either via the GUI or the command line interface (CLI). All SCM module 110 operations may be authorized based on the user's SCM authorization configuration, and/or whether or not the user has been granted SCM trusted user privilege.

The SCM user may, depending upon the roles assigned, manage systems via the SCM module 110. In addition, the user may examine the SCM module log, and scan the group and role configurations. When the SCM user runs a tool, the result may be an SCM task. The SCM module 110 typically assigns a task identifier for every task after it has been defined and before it is run on any target nodes 130. This identifier may be used to track the task and to look up information later about the task in an SCM central log.

An SCM trusted user is an SCM user responsible for the configuration and general administration of the SCM module 110. The trusted user is typically a manager or a supervisor of a group of administrators whom a company trusts, or other trusted individual. Entrusted with the highest authority, the trusted user may execute any system management task with all of the nodes (machines) managed by the SCM module 110. The capabilities of the trusted user include, for example, one or more of the following: creating or modifying a user's security profile; adding, modifying or deleting a node or node group; tool modification; and tool authorization. The granting of these privileges implies a trust that the user is responsible for configuring and maintaining the overall structure of the SCM module 110.

An SCM authorization model supports the notion of assigning to users the ability to run a set of tools on a set of nodes. An authorization object is an association that links a user to a role on either a node or a node group. Each role may have one or more tools and each tool may belong to one or more roles. When users are given the authority to perform some limited set of functionality on one or more nodes, the authorization is done based upon roles and not on tools. The role allows the sum total of functionality represented by all the tools to be divided into logical sets that correspond to the responsibilities that would be given to the various administrators. Accordingly, there are different roles that may be configured and assigned with authorization. For example, a backup administrator with a "backup" role may contain tools that perform backups, manage scheduled backups, view backup status, and other backup functions. On the other hand, a database administrator with a "database" role may have a different set of tools. When a user attempts to run a tool on a node, the user may need to be checked to determine if the user is authorized to fulfill a certain role on the node and if that role contains the tool. Once a user is assigned a role, the user may be given access to any newly created tools that are later added to the role. In the example given above, the backup administrator may be assigned the "backup" role for a group of systems that run a specific application. When new backup tools are created and added to the "backup" role, the backup administrator may immediately be given access to the new tools on the systems.

Figure 2:
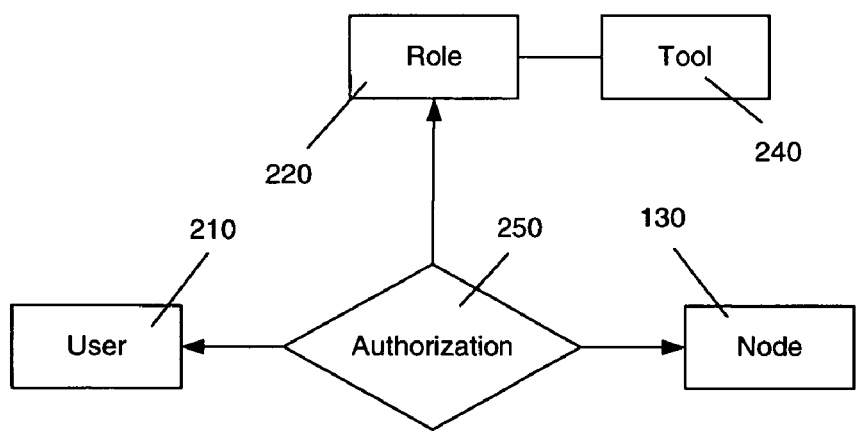
FIG. 2 illustrates the relationships between the user, role, node, tool and authorization objects.

FIG. 2 illustrates the relationships between the user 210, role 220, node 130, tool 240, and authorization 250 objects. User objects 210 represent users 210, role objects 220 represent roles 220, node objects 130 represent nodes 130, tool objects 240 represent tools 240, and authorization objects 250 represent authorizations 250. However, for purposes of this application, these terms are used interchangeably. Each authorization object 250 links a single user object 210 to a single role object 220 and to a single node object 130 (or anode group object 132). Each role object 220 may correspond to one or more tool objects 240, and each tool object 240 may correspond to one or more role objects 220. Each user object 210 maybe assigned multiple authorizations 250, as may each role object 220 and each node object 130. For example, Role 1 may contain Tools 1-N, and User 1 may be assigned Roles 1-M by the authorization model on Node 1. Consequently, User 1 may run Tools 1-N on Node 1, based upon the role assigned, Role 1.

Table 1 illustrates an example of a data structure for assigning tools 240 and commands specified in the tools 240 to different roles 220. Table 2 illustrates an example of a data structure for assigning the roles 220 to different users 210.

TABLE 1

| Roles | Tools | Commands and Applications |
| --- | --- | --- |
| Role 1 | Tools 1-N | Commands 1-L |
| ... | ... | ... |
| Role n | Tools 1-Nn | Commands 1-Ln |

TABLE 2

| Users | Assigned Roles |
| --- | --- |
| User 1 | Roles 1-M |
| ... | ... |
| User n | Roles 1-Mn |

Although FIG. 2 shows a node authorization, a similar structure exists for a node group 132 authorization. The SCM authorization model may be deployed by using node group 132 authorizations more often than node 130 authorizations. This model makes adding new nodes simpler because by adding a node 130 to an existing group 132, any authorizations associated with the group 132 may be inherited at run-time by the node 130.

The authorization model for determining if a user may execute a tool 240 on a set of nodes 130 may be defined by an "all or none" model. Therefore, the user 210 must have a valid authentication association for each target node 130 to execute the tool 240. If authorization does not exist for even one of the nodes 130, the tool execution fails.

Though top-down testing may be employed against many kinds of documents, including internal design specifications and other documents, this methodology may be most effective when used in conjunction with end user documentation which describes command line interfaces or programming interfaces. The following description illustrates, in an exemplary embodiment, how top-down testing can be employed in SCM projects with end user manual pages for the command line interfaces. In a similar fashion, this methodology may be employed against other types of documents.

Top-down testing utilizes, for example, POSIX style assertions, which are rigorous top-down methodology for splitting a document into a set of concisely testable statements called assertions.

The assertions may be classified by being placed in "buckets" in order to give a high level breakdown of the interface being tested, and enable a test writer, i.e., tester, to focus on what to accomplish when writing the assertions for a specific part. The word "buckets" is a general term for a set of categories into which the command line or programming interface might be classified. In IEEE Standard 1003.2-1992 which deals primarily with a command line interface, known as POSIX.2, "buckets" may be selected from the group of Synopsis, Description, Options, Operands, External Influences (Standard Input, Input Files, Environment Variables, Asynchronous Events), External Effects (Standard Output, Standard Error, Output Files), Extended Description, Exit Status, and Consequences of Errors. "Buckets" are referred to as the Utility Description Defaults in POSIX.2, and the Synopsis, Description, Options, Operands, External Influences, External Effects, Extended Description, Exit Status, and Consequences of Errors are referred to as subclauses. Testers may use these "buckets" as defaults, or create a customized set.

For programming interface testing, "buckets" that are more akin to the breakdown of programming interfaces defined in IEEE Standard 1003.1-1989, known as POSIX.1, may be used instead. In the case of graphical user interface (GUI) testing, a different set of "buckets" may be more appropriate.

Figure 3:
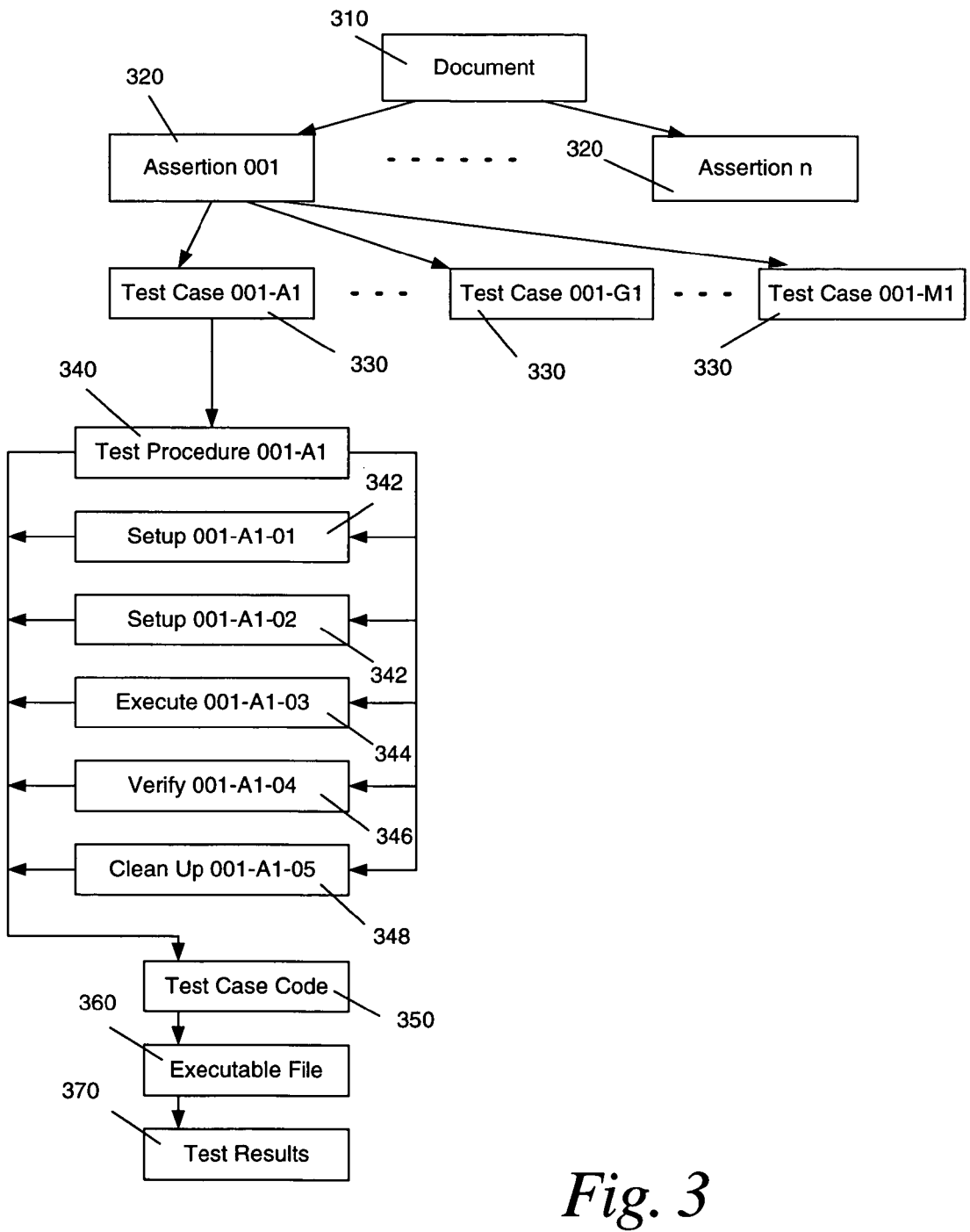
FIG. 3 is a diagram showing how a document is tested using top-down testing through the creation of assertions, test cases, test procedures, and test case code.

The first step in top-down testing may be creation of POSIX style assertions. Referring to FIG. 3, the assertions 320 may be created by processing the document 310 line by line, and splitting the document 310 into a set of concisely testable statements, otherwise known as assertions. The assertions 320, which preferably cover the breadth of the document 310, should be written to point back to their origin in the manual page, (also called "man page"), so that the tester can always go back and uncover the particular line from the end user documentation for which the assertion 320 was written. Next, the assertions 320 may be placed into their appropriate "buckets", for example, Standard Input, Standard Output, or Standard Error output. Two similar assertions 320 may go into two different "buckets", for example, an option which prints to standard output may be bucketed under both Options and under Standard Output.

Once the assertions 320 are created, they may be numbered appropriately, for example, 001, 002, etc. In the next step, the depth of testing appropriate to each assertion 320 may be determined based on the assertion complexity and the amount of test attention warranted by the assertion 320. Then, based on the depth of the testing, test cases 330 appropriate for each assertion 320 may be created. The test cases 330 may then be numbered to reflect the assertion numbering, for example, 001-A1, 001-B1, etc., as shown in FIG. 3. The letters A, B, C, etc. may represent different conditions, i.e., different amount of test attention warranted by the assertion 320.

Next, test procedures 340, also shown in FIG. 3, may be written based on each individual test case 330. The test procedures 340 may be the algorithmic set of steps associated with each individual test case 330, and may include four component parts: one or more test setup procedures 342, one or more test execution procedures 344, one or more result verification procedures 346, and one or more test cleanup procedures 348, which typically break down the tests to return the system back to its original state. Well written test procedures 340 may restore the test system state, thus allowing the tester the flexibility of commenting out the whole assertions 320 or individual test cases 330, explained next.

Top-down testing may involve a regression test suite. The regression test suite is for obtaining a baseline of results on a given revision of a product through a battery of tests. These tests may be run against future revisions of the product to ensure that nothing has been inadvertently broken from one release to the next. The regression test suite may focus on the functionality of the product, but could also test other aspects, such as performance, to ensure that the performance has not degraded from one revision to the next. For a given revision (release) of the product, whenever new functionality is added, new tests may be written to test that new functionality to ensure that the product performs as intended. Those new tests may be added to the existing regression test suite to keep the regression suite up to date.

The test suite created from the top-down testing can be quite extensive, which may translate into long execution times when run, especially in the case of the SCM module 110. When the test suite is executed, it may take around 12–14 hours, for example, to complete the execution on a nightly regression run. Accordingly, when a piece of functionality is added, improved, or modified, the tester may only want to run a subset of the regression suite to make sure that no related functionality has been broken. This may be achieved by executing a partial regression suite. To efficiently run the subset of the regression suite, the tester may utilize a mechanism, referred to as commenting, for limiting the testing to only those test script lines of interest. This mechanism may turn the selected test lines of the non-running tests into comments. An alternative to commenting out the lines of a script may be to remove the lines from the test script.

The use of comments may be in conjunction with shell scripts. The shell scripts, the preferred method of command line testing in the SCM module 110, are file based textual directives provided in a Unix shell for interpretation and execution. The tester who wishes to run scripts may "turn off" certain lines of the shell script on a temporary basis, for reuse at a later time. Rather than removing the lines from the script and re-adding the lines later, a more efficient practice may be to turn the lines into comments. The comments in the shell script may be the text immediately following the first pound-sign (#) in a line, including the pound-sign. Since the pound-sign typically tells the shell script to ignore everything on the line after and including the pound-sign, placing the pound-sign in front of the text for a given line may keep that line from being executed in the shell script. This practice enables the tester to later un-comment the line by removing the pound-sign, so that the line may be executed the next time the shell script is run. As mentioned above, the test procedures 340 may enable the tester the flexibility of commenting out the whole assertions 320 or individual test cases 330 by using the pound-sign.

Referring again to FIG. 3, after test procedures 340 are created for each test case 330, test case code 350 may be derived from the test procedures 340. Then, a script generator may filter the file containing the test case code 350, by turning every line into a comment line until item counters the special symbol denoting the start of the test case code 350, for example, "#CODE_BEGIN". Once the script generator reaches the symbol denoting the end of the test case code 350, for example, "#CODE_END", it may again turn the lines into comments. By turning every line into comments, except the sections between "#CODE_BEGIN" and "#CODE_END", the script generator may enable the assertions 320, the test cases 330, and the test procedures 340 to form valuable comments for the actual executable code 350 in the test scripts. The generated script file may then be executed.

Finally, test results 370 maybe generated from test execution. The text of the test results 370 may be dictated by a set of environment variables that keep track of the success or failure of the current assertion 320 and test case 330. Summary reports may then be created based on the test results 370. The environment variables may be assigned values by the shell script, which may later read those values by referencing the environment variables for an assertion 320. One environment variable, referred to as ASTAT, typically tracks the test results 370 at a coarse grained level, and holds the state of the assertion. Another environment variable, referred to as STAT, typically tracks the test results 370 a finer grained level, and holds the state of the individual test cases 330.

ASTAT, which holds the state of the assertion, may be set to "SUCCESS" at the beginning of the set of test cases 330 for an individual assertion 320. During the execution of the test cases 330 for that assertion, if any failure occurs, ASTAT may be set to "FAILURE". At the end of the testing, the value of ASTAT maybe printed. If all of the test cases 330 associated with the assertion 320 are executed successfully, the printed value of ASTAT may be "SUCCESS". If any of the test cases 330 associated with the assertion 320 are "FAILURE", the value of ASTAT may be "FAILURE".

As mentioned above, STAT may be used to track the status of the execution of the individual test case 330. At a finer grained level, prior to each individual test case 330 being run, the value of STAT may be set to "SUCCESS". If a failure occurs during the execution of the test case code 350, the value of STAT maybe set to "FAILURE". At the end of each test case 330, the value of STAT maybe printed. The value printed maybe "SUCCESS" if the test case 330 completes as expected, and "FAILURE" if the test case 330 detects unexpected results.

Depending on the situation, the generated test scripts may provide a partial or full regression suite when completed. The generated test scripts may test the functionality of the command line as documented. Where a product consists of only a command line interface, the collection of test scripts generated by top-down testing may include a full regression suite. However, if a product includes, for example, a graphical user interface, other types of testing may be involved, and the top-down testing may generate a set of tests which partially covered the full regression needs for the product. To summarize, the top-down testing may create a full regression suite against the user documentation for the command line or programming interface, but may be part of a greater regression suite for a more capable product.

The following are three examples of the top-down testing. There may be a number of commands in the SCM module 110 that the tester can take advantage of in test execution, such as mxauth, mxexec, mxnode, mxngroup, mxrepositorysave, mxrepositoryrestore, mxrole, mxuser, mxtool, and mxsetup commands. Each command may have a manual page.

Example 1 shows an assertion 320 created from the mxrole manual page.

mxrole assertion

A2.1.1 Synopsis

001(A) The implementation provides an exec-able version of mxrole

Test Requirements: Test that mxrole can be invoked directly from env, find, nice, nohup, time and xargs.

Test Case 001-A1: Test that mxrole can be invoked directly from the env utility on an 11.00 MUXPlex Central Management Station (CMS).

This example shows the first assertion 320 written for one of the SCM commands, namely mxrole. The example comes from the "Synopsis" section, referred to as "bucket". The first assertion 320 is numbered 001(A), denoting itself as the first assertion. In this example, only one of the test cases 330, 001-A1, is shown.

The assertion 320 in Example 1 is a complex assertion, because it indicates that the mxrole command can be invoked by a set of commands from which other commands may be executed, for example, the env command, the find command, the nice command, the nohup command, the time command, and the xargs command. Therefore, in this example, there may be at least six test cases 330 for this assertion 320. If an even greater degree of complexity is warranted, or greater attention is desired, there may be more test cases 330 created for this assertion 320.

The following is the test procedures 340 and the test case code 350 (detail not included) for the test case 001-A1. The test case code 350 is surrounded by special symbols that denote the beginning and end of the test case code 350.

A2.1.1 mxrole
A2.1.1.1 Synopsis
001(A) I'm the first assertion.
Test Case 001-A1. I'm the first test case for the first assertion.
Test procedure
Step 001-A1-1 (setup): set up the system
Step 001-A1-2 (setup): set up Service Control Manager
Step 001-A1-3 (execution): run the mxrole command with the −1 option
Step 001-A1-4 (verification): check that standard output and standard error are not generated
Step 001-A1-5 (verification): check that the return value of the command is zero
Step 001-A1-6 (cleanup): Remove the role created in step #3 from the system
CODE_BEGIN
<REAL EXECUTABLE SHELL SCRIPT CODE INSERTED HERE>
CODE_END
Test Case 001-A2. I'm the second test case for the first assertion.

Next, a script generator may filter this file to create a new test script, by turning every line into a comment line until it encounters the special symbol denoting the start of the test case code 350, i.e., #CODE_BEGIN. The line immediately following the #CODE_BEGIN statement may be copied to the new script file unaltered. Once the script generator reaches the symbol denoting the end of the test case code 350, i.e., #CODE_END, it may again start turning the lines into comments.

A2.1.1 mxrole

A2.1.1.1 Synopsis

001(A) I'm the first assertion.

Test Case 001-A1. I'm the first test case for the first assertion.

Test Procedure
Step 001-A1-1 (setup): set up the system
Step 001-A1-2 (setup): set up Service Control Manager
Step 001-A1-3 (execution): run the mx_role command with the −1 option
Step 001-A1-4 (verification): check that standard output and standard error
are not generated
Step 001-A1-5 (verification): check that the return value of the command
is zero
Step 001-A1-6 (cleanup): Remove the role created in step #3 from the system
<REAL EXECUTABLE SHELL SCRIPT CODE INSERTED HERE>
Test Case 001-A2. I'm the second test case for the first assertion.

Accordingly, by turning every line into comments, except the sections between #CODE_BEGIN and #CODE_END, the script generator enables the assertions 320, test cases 330, and test procedures 340 to form valuable comments for the actual executable code 350 in the test scripts. Conventions may be used in the test case code 350 itself, so that the test case code 350 for test case 001-A1 may identify itself, along with an associated timestamp. The test case code 350, after filtered and turned into executable files 360, may also output test results 370, such as "SUCCESS" or "FAILURE". A typical assertion, as in Example 1, may also indicate its origin.

Example 2 shows an assertion 320 involving the mxnode manual page.

mxnode assertion from mxnode man page
019(A) When mxnode is invoked with the -a option, followed by the -f option and a filepath option-argument, then zero or more nodes are added to the Central Management Station, based on the contents of the file with the pathname filepath. (Derived from Description section of mxnode(1M) man page, Rev 1.9)
Test Case 019-A1: Test that when mxnode is invoked as "mxnode -a -f filepath" where filepath points to an empty nodes file, then mxnode will add no nodes on an 11.00 MUXPlex Central Management Station (CMS).

Similar to Example 1, the assertion 019 in Example 2 indicates, in parenthesis, that it is derived from the manual page for mxnode. It also discloses the revision of the manual page as well as the section of the manual page from which the assertion 019 came. If the manual pages have line numbers, the assertions may point to the specific line number on the manual page, so that the tester may always go back and uncover the particular line for which the assertion was written. By using the phrase "zero or more nodes . . . .", the assertion 019 suggests that there are a number of test cases, such as the test cases for zero nodes, one nodes, or two nodes, that can be written from the assertion 019. The test case shown, 019-A1, describes the test case for zero nodes.

Example 3 illustrates the procedures and results for creating assertions 320 from the mxtool manual page, creating test cases 330 appropriate for each assertion, creating test procedures 340 for each test case 330, deriving test case code 350 from the test procedures 340, and filtering and turning the test case code 350 into an executable file 360 by a script generator.

The following section 1 shows a pre-filtered file of an assertion 001 corresponding to the mxtool manual page, one of many test cases 001-A1 created for the assertion 001, the test procedures 001-A1-01 to 05 created for test case 00-A1, and test case code derived from the test procedures 001-A1-01 to 05. As shown in the section below, there may be a number of test cases 001-A1, . . . 001-C1, . . . created for the assertion 001 (only one test case 001-A1 is shown), and for the test case 001-A1, there are five test procedures, including two test setup procedures 001-A1-01, 001-A1-02, one test execution procedure 001-A1-03, one result verification procedure 001-A1-04, and one test cleanup procedure 001-A1-05.

A2.14 mxtool—add, list, modify or delete tools

A2.14.1 Synopsis

001(A) The implementation allows one or more blank characters between an option and the corresponding argument.
(Derived from R01 in section 2.10.2 of POSIX.2 assertions)

Test Case 001-A1: Test that mxtool can be invoked as "mxtool -a -f<filepath>" where filepath is a tool definition file on an 11.00 MUXPlex Central Management Station.

001-A1-01 (setup): Follow the general procedure TST-001 to setup an 11.00 CMS.

001-A1-02 (setup): Create a blank tool definition file called tdf.

001-A1-03 (execute): Run the command "mxtool -a -ftdf" and redirect the standard output to resout and the standard error to reserr.

001-A1-04 (verify): Check to see that mxtool returned with a value of zero and that reserr is empty.

001-A1-05 (cleanup): Remove the file tdf.

```
#CODE_START
###################################################

# Automated test procedure for Test Case 001-A1

###################################################
{
STAT=PASS
#Create blank tool definition
cat > tdf << !EOF
SSA tool "List Dir" {
   description "List contents of a directory"
   category "General tool"
   owner root
   execute {
      command "/usr/bin/ls"
      arguments {
         "-a":"Command to look for"
      }
   }
}
!EOF
#Run command mxtool
mxtool -a -ftdf>resout 2>reserr
#Test return and output
if [ $?!=0 ]; then
   print "FAILURE. command returned a value other than zero."
   STAT=FAIL
fi
##if [ -s reserr ]; then
print "FAILURE. Command had no error output when none was expected."
STAT=FAIL
fi
# Cleanup
rm tdf
mxtool -r -t "List Dir"
if [ $STAT != FAIL ]; then
   print "SUCCESS. Test Case 001-A1 completed without errors."
else
   ASTAT=FAILED
   print "FAILURE. Test Case 001-A1 completed with errors."
fi
}
#CODE_END
```

The following section 2 illustrates a test script file 360 corresponding to assertion 001, generated by filtering the test documentation file for one of the SCM tools 240 by the script generator. The SCM tool in this example is the mxtool command. The test documentation file is a representative source file from which a set of test scripts may be generated by the script generator. As shown below, the test documentation filter generates pre-assertion test code comments from the test documentation by turning every line into a comment line until it detects the special symbol denoting the start of the test case code 350, i.e., #CODE_START. Once the script generator reaches the symbol denoting the end of the test case code 350, i.e., #CODE_END, it may again turn the lines into comments. Between the #CODE_START and the #CODE_END symbols, the script generator may copy the test documentation verbatim to the script file. As the end of the test documentation for the assertion is reached, the filter may generate post-assertion test code comments.

```
./opt/tet/nightly/ts_exec/lib/libfuncs
#!/usr/bin/sh
{
print "******** Starting script mxtool:001 ('date') *********"
resultout=stat_mxtool
print "Sending test results to file $resultout"
if [ ! -a $resultout ]; then
   cat/dev/null/ > $resultout
   print "***** BEGIN mxtool *****" >> $resultout
   print "Abbreviated test results for mxtool" >> $resultout
   print "system: $(uname -a)" >> $resultout
   print "MUXPlex revision: $(what/opt/mx/bin/mxexec)" >> $resultout
   print "mxtool_assertions.txt revision: $(what mxtool_assertions.txt)" >> $resultout
   print "start time: $(date)" >> $resultout
   tsec; print "ts_s $stime" >> $resultout
   print " " >> $resultout
fi
ASTAT=Passed
}

{
print "mxtool assertion 001:" >> $resultout
print "Starting assertion 001"
ASTAT=Passed
tsec; et1=$stime
}
#001(A) The implementation allows one or more blank characters between
#   an option and the corresponding argument.
#   (Derived from R01 in section 2.10.2 of POSIX.2 assertions)

#   Test Case 001-A1: Test that mxtool can be invoked as "mxtool -a
#     -f<filepath>" where filepath is a tool definition
#     file on an 11.00 MUXPlex Central Management
#     Station.

#   001-A1-01 (setup): Follow the general procedure TST-001 to
#     setup an 11.00 CMS.

#   001-A1-02 (setup): Create a blank tool definition file called
#     tdf.

#   001-A1-03 (execute): Run the command "mxtool -a -ftdf" and
#     redirect the standard output to resout and
#     the standard error to reserr.

#   001-A1-04 (verify): Check to see that mxtool returned with a
#     value of zero and that reserr is empty.

#   001-A1-05 (cleanup): Remove the file tdf.

###################################################

# Automated test procedure for Test Case 001-A1

###################################################
{
STAT=PASS
#Create blank tool definition
cat > tdf << !EOF
```

-continued

```
SSA tool "List Dir" {
   description "List contents of a directory"
   category "General tool"
   owner root
   execute {
      command "/usr/bin/ls"
      arguments {
         "-a":"Command to look for"
      }
   }
}
!EOF
#Run command mxtool
mxtool -a -ftdf>resout 2>reserr
#Test return and output
if [ $?!=0 ]; then
   print "FAILURE. command returned a value other than zero."
   STAT=FAIL
fi
##if [ -s reserr ]; then
print "FAILURE. Command had no error output when none was expected."
STAT=FAIL
fi
# Cleanup
rm tdf
mxtool -r -t "List Dir"
if [ $STAT != FAIL ]; then
   print "SUCCESS. Test Case 001-A1 completed without errors."
else
   ASTAT=FAILED
   print "FAILURE. Test Case 001-A1 completed with errors."
fi
}
{
print " Test Case: 001-A1 Status: ${STAT}ED" >> $resultout
print "timestamp: $(date)"
if [ $STAT = FAIL ]; then
   print "RESOUT:"
   cat resout
   print "RESERR:"
   cat reserr
fi
print " "
}

```

The following section 3 shows the test execution results 370 for some of the test scripts, 001-A1, 001-B1, . . . 003-F1, 004-A1 . . . . Since the results generated by the test scripts are run from a special test scaffold in this exemplary embodiment, and the scaffold only prints output for tests it believes had failed, the scaffold may be artificially induced to cause each script to fail so their output can be shown. The reason for the "failure" message in each line associated with the test cases 330 is for the output to be shown, because only the output on a failure may be shown in this example. The values of the environment variables, such as ASTAT and STAT, shown in section 2 above are maintained for each assertion and each individual test case, and are translated into "SUCCESS" or "FAILURE" values in the result report in the following section 3.

```
SCM CLI functionality tests
Failing Assertions and Actiual Test Output
Execution date: 12/14/Year
at 18:36:49 local time.
CMS:   popeye
Managed nodes:   bluto.fc.hp.com
Operating system:   B.11.00
Machine model:   9000/800/A180c
```

-continued

```
SCM revision:
ServiceControl Manager A.02.00%03 (RC03:12/06/Year 13:05:53)
====================================================
mxauth Test Case 001-A1 (failure #1)
Assertion and Test Case:
Actual Test Output:
>mxauth 001-A1
>******** Starting script mxauth:001 (Thu Dec 14 18:42:18 MST Year) *********
>Sending test results to file stat_mxauth
>can't open mxauth_assertions.txt (26)
>Starting assertion 001
>SUCCESS. Test case 001-A1 complete without errors.
>timestamp: Thu Dec 14 18:42:34 MST Year
>ASSERTION 001    Passed 18:42:35 (runtime: 0:00:16)
>mxauth:001 Passed *********
>********** Ending script mxauth:001 (Thu Dec 14 18:42:35 MST Year) *********
--------------------------------------------------
mxauth Test Case 001-B1 (failure #2)
Assertion and Test Case:
Actual Test Output:
>mxauth 001-B1
>******** Starting script mxauth:001 (Thu Dec 14 18:42:36 MST Year) *********
>Sending test results to file stat_mxauth
>Starting assertion 001
>SUCCESS. Test case 001-B1 complete without errors.
>timestamp: Thu Dec 14 18:42:52 MST Year
>ASSERTION 001    PASSED 18:42:52 (runtime: 0:00:16)
>mxauth:001 Passed *********
>********** Ending script mxauth:001 (Thu Dec 14 18:42:52 MST Year) *********
--------------------------------------------------
..........
--------------------------------------------------
mxauth Test Case 003-F1 (failure #22)
Assertion and Test Case:
Actual Test Output:
>mxauth 003-F1
>******** Starting script mxauth:003 (Thu Dec 14 18:46:43 MST Year) *********
>Sending test results to file stat_mxauth
>Starting assertion 003
>SUCCESS. Test Case 003-F1 completed without errors.
>timestamp: Thu Dec 14 18:46:48 MST Year
>ASSERTION 003    Passed 18:46:49 (runtime: 0:00:06)
>mxauth:003 Passed *********
>********** Ending script mxauth:003 (Thu Dec 14 18:46:49 MST Year) *********
--------------------------------------------------
mxauth Test Case 004-A1 (failure #23)
Assertion and Test Case:
Actual Test Output:
>mxauth 004-A1
>******** Starting script mxauth:004 (Thu Dec 14 18:46:50 MST Year) *********
>Sending test results to file stat_mxauth
>Starting assertion 004
>SUCCESS. Test 004-A1 completed without errors.
>timestamp: Thu Dec 14 18:46:56 MST Year
>ASSERTION 004    Passed 18:46:56 (runtime: 0:00:06)
>mxauth:004 Passed *********
>********** Ending script mxauth:004 (Thu Dec 14 18:46:56 MST Year) *********
```

Examples 1 and 2 described above illustrate that, by providing detailed script language execution lines in the test documentation and assertions that point to the exact line of document testing, top-down testing preferably enables the tester to always go back and uncover the particular line for which the assertion was written in the user documentation. In addition, as illustrated with respect to Example 3, by keeping test case code 350 in with the assertions 320, test cases 330, and test procedures 340, top-down testing provides a convenient reference to the tester, so that the tester can quickly become productive with little product knowledge or test expertise.

Figure 4:
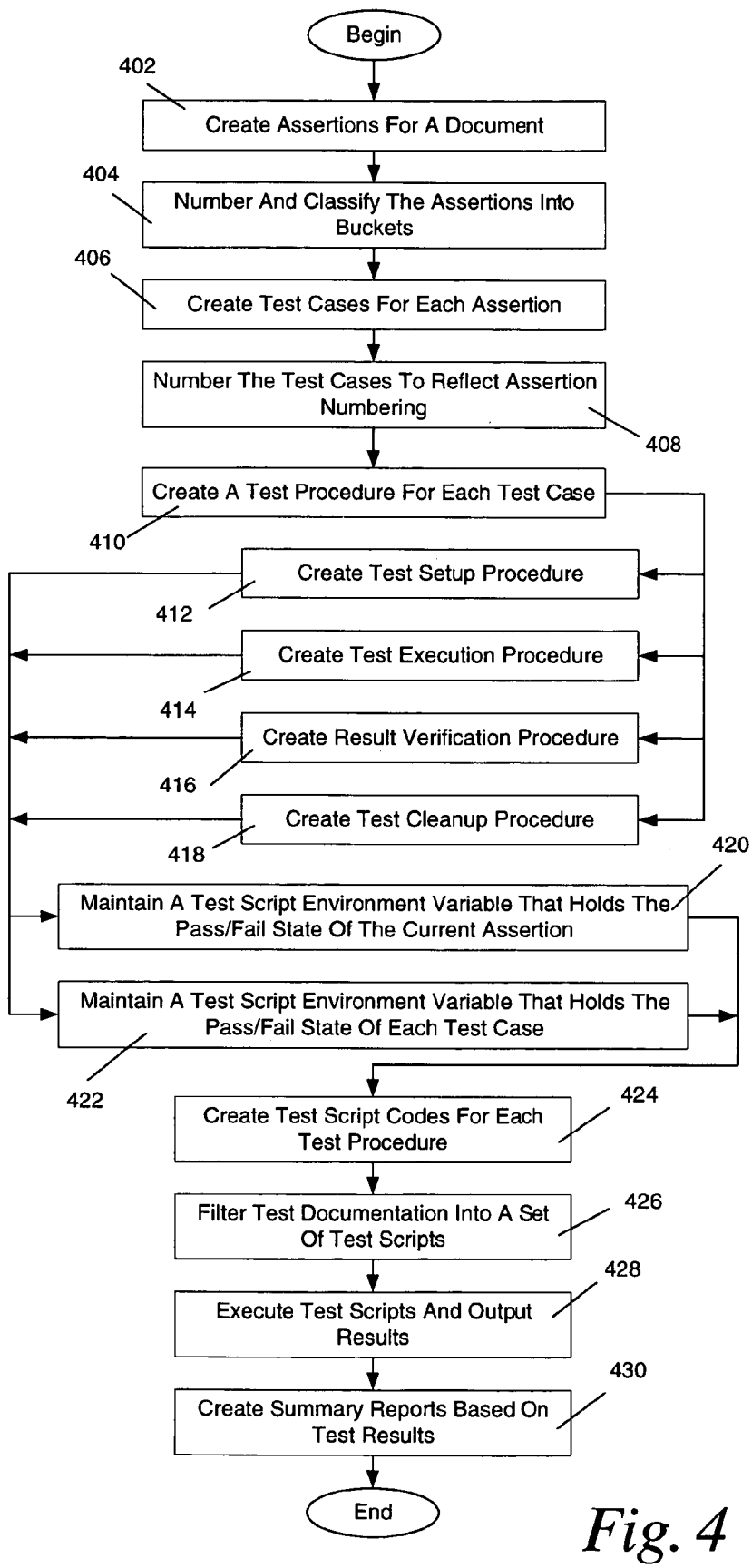
FIG. 4 is a flow chart of a method for top-down testing in an SCM module.

FIG. 4 is a flow chart of a method for top-down testing in the SCM module. This method may be implemented, for example, in software modules for execution by processor 108. First, assertions 320 may be created for the document 310 to be tested by processing the document 310 line-by-line, and splitting the document 310 into a set of testable statements, step 402. The assertions 320, preferably covering the breadth of the document 310 and always pointing back to their origin, may be numbered as, for example, 001, 002, etc., and classified into buckets, step 404. Buckets may be selected from the group of Synopsis, Description, Options, Operands, External Influences, External Effects, Extended Description, Exit Status, and Consequences of Errors.

Next, test cases 330 may be created for each assertion, reflecting the depth of test appropriate to each assertion 320, based on the assertion complexity and amount of test attention warranted by the assertion, step 406. The test cases 330 may be numbered to reflect the assertion numbering, for example, as 001-A1, 001-B1, etc., step 408.

In the next step, test procedures 340 may be created for each test case 330, step 410. The test procedures 340, as the algorithmic set of steps associated with each individual test case 330, may include four component parts: one or more test setup procedures 342, step 412, one or more test execution procedures 344, step 414, one or more result verification procedures 346, step 416, and one or more test cleanup procedures 348, step 418. During the result verification procedures 346, two test script environment variables may be maintained to hold both the state of the assertion, referred to as ASTAT, and the state of each test case 330, referred to as STAT, steps 420 and 422, respectively. The environment variables may be used to return test results 370, such as "SUCCESS" or "FAILURE" for each assertion and for each test case.

After test procedures 340 are created for each test cases 330, test script code 350 may be derived from the test procedures 340 to test each and every test cases 330, step 424. Then, the script generator may filter the test documentation into a set of test scripts, which are executable files 360, step 426. After the test scripts are executed, test results 370, such as "SUCCESS" or "FAILURE", may be outputted via the environment variables, step 428, and summary reports created based on the test results 370, step 430.

While the present invention has been described in connection with an exemplary embodiment, it will be understood that many modifications will be readily apparent to those skilled in the art, and this application is intended to cover any variations thereof.

What is claimed is:

1. A computer method for top-down testing, comprising:
creating assertions for an end user document by processing the end user document line by line and splitting the end user document into a set of concisely testable statements, wherein the assertions point to one or more lines of the end user document being tested so that a tester can uncover a particular line from the end user document for which assertions are created;
pointing the assertions back to an originating document;
creating test cases appropriate for each assertion, wherein the test cases relate to the depth of test appropriate to each assertion;
creating test procedures for each test case; and
deriving test case code from the test procedures,
wherein modifications to the originating document propagates through the test procedures without a need to rewrite the assertions and the test cases.

2. The method of claim 1, further comprising:
turning the test case code into executable files;
outputting test execution results; and
creating summary reports based on the test results.

3. The method of claim 1, wherein the creating the assertions step includes numbering and classifying the assertions into buckets.

4. The method of claim 3, wherein the creating the test cases step includes numbering the test cases to reflect the assertion numbering.

5. The method of claim 3, wherein the creating the assertions step includes selecting the buckets, wherein for command line end user documentation, the buckets can be selected from the group of Synopsis, Description, Options, Operands, External Influences, External Effects, Extended Description, Exit Status, and Consequences of Errors.

6. The method of claim 1, wherein the creating the test cases step includes creating the test cases based on a complexity of the assertion and an amount of test attention warranted by the assertion.

7. The method of claim 1, wherein the creating the test procedures step includes creating one or more test setup procedures, one or more test execution procedures, one or more result verification procedures, and one or more test cleanup procedures.

8. The method of claim 1, further comprising maintaining an environment variable that holds the state of the assertion.

9. The method of claim 1, further comprising maintaining an environment variable that holds the state of each test case.

10. A computer apparatus for top-down testing, comprising:
a module for creating assertions for an end user document by processing the end user document line by line and splitting the end user document into a set of concisely testable statements, wherein the assertions point to one or more lines of the end user document being tested so that a tester can uncover a particular line from the end user document for which assertions are created, wherein the assertions point back to an originating document;
a module for creating test cases appropriate for each assertion, wherein the test cases relate to the depth of test appropriate to each assertion;
a module for creating test procedures for each test case; and
a module for deriving test case code from the test case procedures,
wherein modifications to the originating document propagates through the test procedures without a need to rewrite the assertions and the test cases.

11. The apparatus of claim 10, further comprising:
a module for turning the test case code into executable files;
a module for outputting test execution results; and
a module for creating summary reports based on the test results.

12. The apparatus of claim 10, wherein the assertions are numbered and classified into buckets.

13. The apparatus of claim 12, wherein the test cases are numbered to reflect the assertion numbering.

14. The apparatus of claim 10, wherein the module for creating the test procedures step includes modules for creating one or more test setup procedures, modules for creating one or more test execution procedures, modules for creating one or more result verification procedures, and modules for creating one or more test cleanup procedures.

15. The apparatus of claim 10, further comprising modules for maintaining environment variables that holds the states of the assertion and each test case.

16. A computer method for top-down testing, comprising:
creating assertions for an end user document by processing the end user document line by line and splitting the end user document into a set of concisely testable statements, wherein the assertions point to one or more lines of the end user document being tested so that a tester can uncover a particular line from the end user document for which assertions are created;
pointing the assertions back to an originating document;
creating test cases appropriate for each assertion, wherein the test cases relate to the depth of test appropriate to each assertion, based on a complexity of the assertion and an amount of test attention warranted by the assertion;
creating test procedures for each test case, wherein the test procedures include one or more test setup procedures, one or more test execution procedures, one or more result verification procedures, or one or more test cleanup procedures;
maintaining environment variables that hold the states of the assertion and each test case; and
deriving test case code from the test procedures,
wherein modifications to the originating document propagates through the test procedures without a need to rewrite the assertions and the test cases.

17. The method of claim 16, further comprising:
turning the test case code into executable files;
outputting test execution results; and
creating summary reports based on the test results.

18. The method of claim 16, wherein the creating the assertions step includes numbering and classifying the assertions into buckets.

19. The method of claim 16, wherein the creating the test cases step includes numbering the test cases to reflect the assertion numbering.

20. The method of claim 1, wherein the top town testing is applied to a service control manager (SCM) module running on a central management server (CMS) and one or more nodes managed by the SCM module.

21. The apparatus of claim 10, wherein the top town testing is applied to a service control manager (SCM) module running on a central management server (CMS) and one or more nodes managed by the SCM module.

22. The method of claim 16, wherein the top town testing is applied to a service control manager (SCM) module running on a central management server (CMS) and one or more nodes managed by the SCM module.

* * * * *